March 19, 1963 J. B. RIDENOUR 3,081,477
WINDSHIELD WIPER BLADE
Filed April 7, 1960
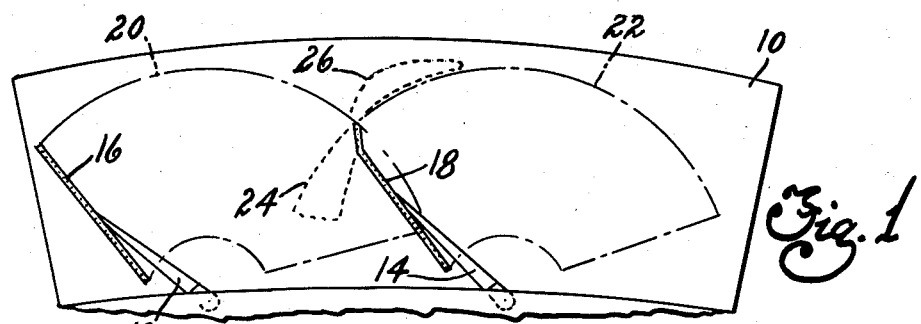
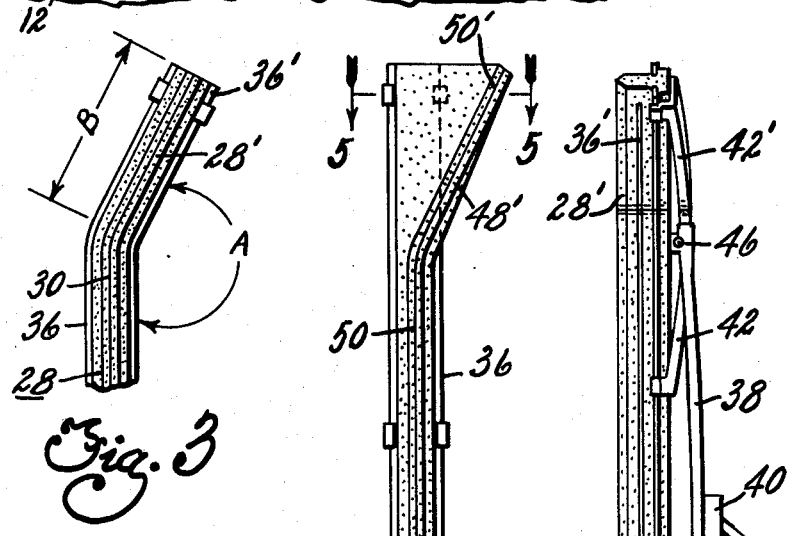
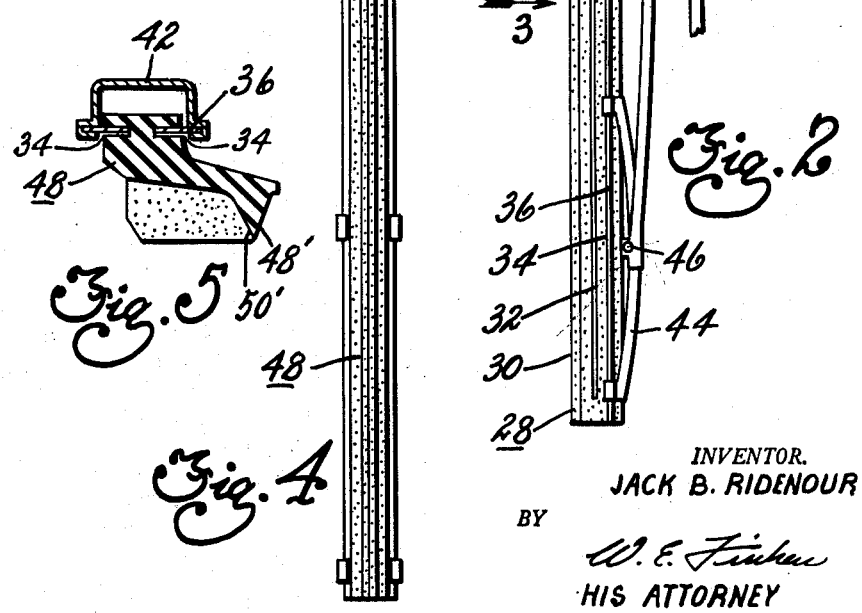
INVENTOR.
JACK B. RIDENOUR
BY
W. E. Finken
HIS ATTORNEY United States Patent Office 3,081,477
Patented Mar. 19, 1963

3,081,477
WINDSHIELD WIPER BLADE
Jack B. Ridenour, Lansing, Mich., assignor to General Motors Corporation, Detroit, Mich., a corporation of Delaware
Filed Apr. 7, 1960, Ser. No. 20,590
3 Claims. (Cl. 15—250.3)

This invention pertains to windshield wiper blades, and particularly to a wiper blade designed for use in a windshield cleaning system wherein the wiping paths of the blades overlap.

At the present time there are two principal dual wiper systems for cleaning vehicular windshields, namely tandem, or in phase oscillation of wiper blades, and oscillation of wiper blades in phase opposition. Moreover, in some phase opposition oscillatory wiper systems, in order to increase the area of the windshield cleaned by the wiper blades, the wiping paths of the blades overlap adjacent the central portion of the windshield. Similarly, in most tandem wiper systems the wiping paths of the two oscillatable blades overlap in the central portion of the windshield.

While overlapping wiping paths in the central portion of a windshield are advantageous, inasmuch as if the paths do not overlap a portion of the windshield is not cleaned and thus interferes with the driver's vision, it is well recognized that conventional wiper blades which are adapted for wiping substantially flat and convexly curved windshields, do not perform satisfactorily. I have observed that the principal reason for the unsatisfactory operation of conventional wiper blades in a wiper system wherein the wiper blades have overlapping wiping paths, is due to the accumulation of large amounts of liquid along the tip portion of the leading edge of the squeegee, which liquid is carried, or thrown, by its own momentum onto the path of the other wiper blade upon movement reversal thereof.

The present invention relates to improved wiper blade assemblies having angularly offset tip portions which do not accumulate any appreciable quantity of liquid, and consequently do not deflect any appreciable quantity of liquid onto the wiping path of the other blade upon movement reversal. Accordingly, among my objects are the provision of a windshield wiper blade having an angularly offset tip portion; the further provision of a windshield wiper blade having a squeegee, a backing strip and a pressure applying superstructure with angularly offset tip portions; and the still further provision of a windshield wiper blade assembly having a squeegee with an angularly offset tip portion and a backing strip and pressure applying superstructure which is substantially linear.

The aforementioned and other objects are accomplished in the present invention by angularly offsetting the tip portion of the wiper blade in a direction leading the movement reversal at the stroke end. Specifically, two embodiments of an improved wiper blade assembly designed for wiping systems having overlapping wiping paths are disclosed herein. Both embodiments may utilize any conventional pressure applying superstructures for distributing wiping pressure to a plurality of longitudinally spaced points throughout the length of the squeegee unit. Thus, the triple yoke pressure applying superstructure disclosed herein is only exemplary. In the triple yoke pressure applying superstructure, which comprises a primary yoke and a pair of secondary yokes pivotally connected to the ends of the primary yokes, the primary yoke is adapted for connection to a wiper arm at its central portion. The ends of the secondary yokes are adapted to be movably connected to the backing strip of the squeegee unit. In both embodiments, the squeegee unit comprises an elongate elastomeric wiping element and a spring metal backing strip which confines flexibility of the squeegee unit to a plane normal to the surface to be wiped. The backing strip is substantially rigid in a plane parallel to the surface to be wiped.

In one embodiment, the backing strip has an angularly offset tip portion, and the squeegee unit is molded with a complementary angularly offset tip portion. The outer end of the tip secondary yoke is likewise angularly offset to facilitate attachment to the backing strip.

In a second embodiment, the backing strip and pressure applying superstructure are of conventional design. That is, both the backing strip and the pressure applying superstructure are linearly arranged and movably interconnected. However, the squeegee is molded with an angularly offset wiping lip adjacent its tip portion.

Wiper blades constructed according to either embodiment of the present invention accumulate little, if any, liquid in advance of the tip portion of the wiper blades so that upon movement reversal, little or no liquid is carried, or thrown, by its own momentum onto the wiping path of the other wiper blade. Since in the tandem type of overlapping wiper systems the water throwing propensities of only one of the two blades is detrimental, the other wiper blade may be of conventional design.

Further objects and advantages of the present invention will be apparent from the following description, reference being had to the accompanying drawings, wherein preferred embodiments of the present invention are clearly shown, and wherein similar numerals depict similar parts throughout the several views.

In the drawings:

FIGURE 1 is a schematic view from inside a vehicle of a tandem wiper system having overlapping wiping paths with one wiper blade constructed according to one embodiment of the present invention.

FIGURE 2 is a side elevational view of a wiper blade constructed according to one embodiment of the present invention.

FIGURE 3 is a fragmentary view in elevation, taken in the direction of arrow 3 of FIGURE 2.

FIGURE 4 is a bottom view of a wiper blade constructed according to the second embodiment of this invention.

FIGURE 5 is an enlarged sectional view taken along line 5—5 of FIGURE 4.

With particular reference to FIGURE 1, a schematic tandem windshield wiper system is disclosed in conjunction with a windshield 10. The wiper system comprises a pair of wiper arms 12 and 14 of conventional construction, comprising spring-hinge connected inner and outer sections. The inner sections are adapted to be drivingly connected to a pair of oscillatable wiper shafts, not shown, which are driven symmetrically, or in phase. The outer sections of the wiper arms 12 and 14 carry wiper blades 16 and 18 which are movable throughout oscillatory strokes producing wiping paths shown by dotted lines depicted by numerals 20 and 22, respectively. As apparent from FIGURE 1, the inboard stroke end of the passenger's wiper blade 18 overlaps the wiping path of the driver's wiper blade 16 in the central portion of the windshield.

As alluded to hereinbefore, when conventional wiper blades are used on both the passenger's and driver's side, the passenger's wiper blade accumulates relatively large amounts of liquid along the tip portion of the leading edge during its inboard stroke. Upon movement reversal of the wiper blade 18 and arm 14 at its inboard stroke end, the squeegee reverses its movement, or travel, and this deacceleration allows the momentum of the accumulated liquid to carry, or throw, it onto the wiping path of the driver's wiper blade in the area depicted by dotted lines 24 in FIGURE 1. The liquid accumulated in advance of the tip portion of the passenger's wiper blade 18 flows primarily from the area depicted by dotted lines 26.

The driver's wiper blade 16 may be of any conventional type suitable for wiping flat as well as convexly curved windshields. This type of wiper generally comprises a squeegee unit, comprising an elastomeric elongate wiping element and a resilient metal backing strip, and a pressure distributing superstructure having a plurality of relatively movable parts movably connected with the backing strip at longitudinally spaced points for distributing arm pressure to the flexible squeegee unit. The squeegee, the backing strip, and the superstructure members are all in linear alignment.

With reference to FIGURES 2 and 3, one embodiment of the improved wiper blade assembly for use on the passenger's side of a tandem wiper system will be described. The wiper blade assembly comprises an elongate elastomeric squeegee 28 of substantially rectilinear configuration having a wiping lip 30 along one edge, a pair of flexure grooves 32 which terminate short of the ends of the squeegee unit and permit the wiping lip to assume the proper drag position, and a pair of longitudinally extending backing strip receiving grooves 34 adjacent the retention bead. The grooves 34 receive the coplanar rails of a resilient backing strip 36 which is freely flexible in a plane normal to the surface to be wiped, but substantially inflexible in a plane parallel to the surface to be wiped. In the disclosed embodiment, the pressure distributing superstructure comprises a primary yoke 38 having a central arm attaching part 40, and a pair of secondary yokes 42 and 44. The secondary yoke 42 will hereinafter be referred to as the tip yoke and the secondary yoke 44 will be referred to as the heel yoke. The tip and heel yokes 42 and 44 are pivotally connected to the ends of the primary yoke 38 by any suitable means, such as pins 46. Opposite ends of the tip and heel yokes 42 and 44 are movably connected to spaced points of the backing strip 36.

Referring particularly to FIGURE 3, the squeegee 28 is molded with an angularly offset tip portion indicated by numeral 28'. Similarly, the backing strip 36 has an angularly offset tip portion 36'. In a similar manner, the outer end portion 42' of the tip yoke is angularly offset. The angular offset is in a direction leading the movement reversal of the passenger's blade 18 at the inboard stroke end, as indicated in FIGURE 1.

With a wiper blade of the construction disclosed in FIGURES 2 and 3, liquid does not accumulate in advance of the tip portion of the squeegee during the inboard stroke of the passenger's blade 18. Accordingly, upon reversal of direction of the passenger's blade 18 towards its outboard stroke end position, liquid is not thrown onto the wiping path of the driver's wiper blade 16. The angle A of the offset and the length B of the offset are determined by the windshield configuration as well as other factors such as wiper speed and the drag angle between the squeegee and the glass.

With reference to FIGURES 4 and 5, in the modified embodiment, the backing strip 36 and the tip yoke 42 are in alignment with the longitudinal axis of the blade throughout their entire lengths. However, the squeegee 48 is molded with an angularly offset tip portion 48' as clearly shown in FIGURE 5. The squeegee 48 has a wiping lip 50 with an angularly offset portion depicted by numeral 50'. The wiper blade depicted in FIGURES 4 and 5 likewise does not accumulate any appreciable quantity of liquid in advance of the tip portion during its inboard stroke.

While the embodiments of the invention as herein disclosed constitutes preferred forms, it is to be understood that other forms might be adopted.

What is claimed is as follows:

1. In a vehicle windshield wiper system having a pair of wiper blades oscillated in tandem with an overlapping wiped area adjacent the central portion of the windshield, the wiper blades comprising elongate squeegees and pressure distributing superstructures, the improvement which comprises angularly offseting the tip portion of the squeegee of one wiper blade to prevent the throwing of accumulated liquid onto the path traversed by the other wiper blade, the angular offset being in a direction leading the blade upon movement of said one wiper blade away from the overlapping wiped area.

2. In a vehicle windshield wiper system having a pair of wiper blades oscillated in tandem throughout strokes having overlapping paths over a portion of the windshield, the wiper blades comprising elongate squeegees and elongate resiliently flexible surface conforming supports, the improvement which comprises angularly offsetting the tip portion of the squeegee of one wiper blade to prevent the throwing of accumulated liquid onto the path taversed by the other wiper blade, the angular offset being in a direction leading the blade upon movement of said one wiper blade away from the overlapping paths.

3. In a vehicle windshield wiper system having a pair of wiper blades oscillated in tandem throughout strokes having overlapping paths over a portion of the windshield, the wiper blades comprising elongate squeegees and elongate resiliently flexible surface conforming supports, the improvement which comprises angularly offsetting the tip portion of the squeegee of one wiper blade to prevent the throwing of accumulated liquid onto the path traversed by the other wiper blade, the angular offset being in a direction leading the blade upon movement of said one wiper blade away from the overlapping paths, the tip portion of the surface conforming support of said one wiper blade being angularly offset coextensive with the tip portion of said squeegee.

References Cited in the file of this patent

UNITED STATES PATENTS

| | | |
|---|---|---|
| 1,978,192 | Freud | Oct. 23, 1934 |
| 2,257,789 | Hoffmann | Oct. 7, 1941 |
| 2,548,090 | Anderson | Apr. 10, 1951 |

FOREIGN PATENTS

| | | |
|---|---|---|
| 1,188,012 | France | Mar. 9, 1959 |